H. D. WALKER.
SPLIT PULLEY.
APPLICATION FILED MAY 15, 1907.
937,742.  Patented Oct. 19, 1909.
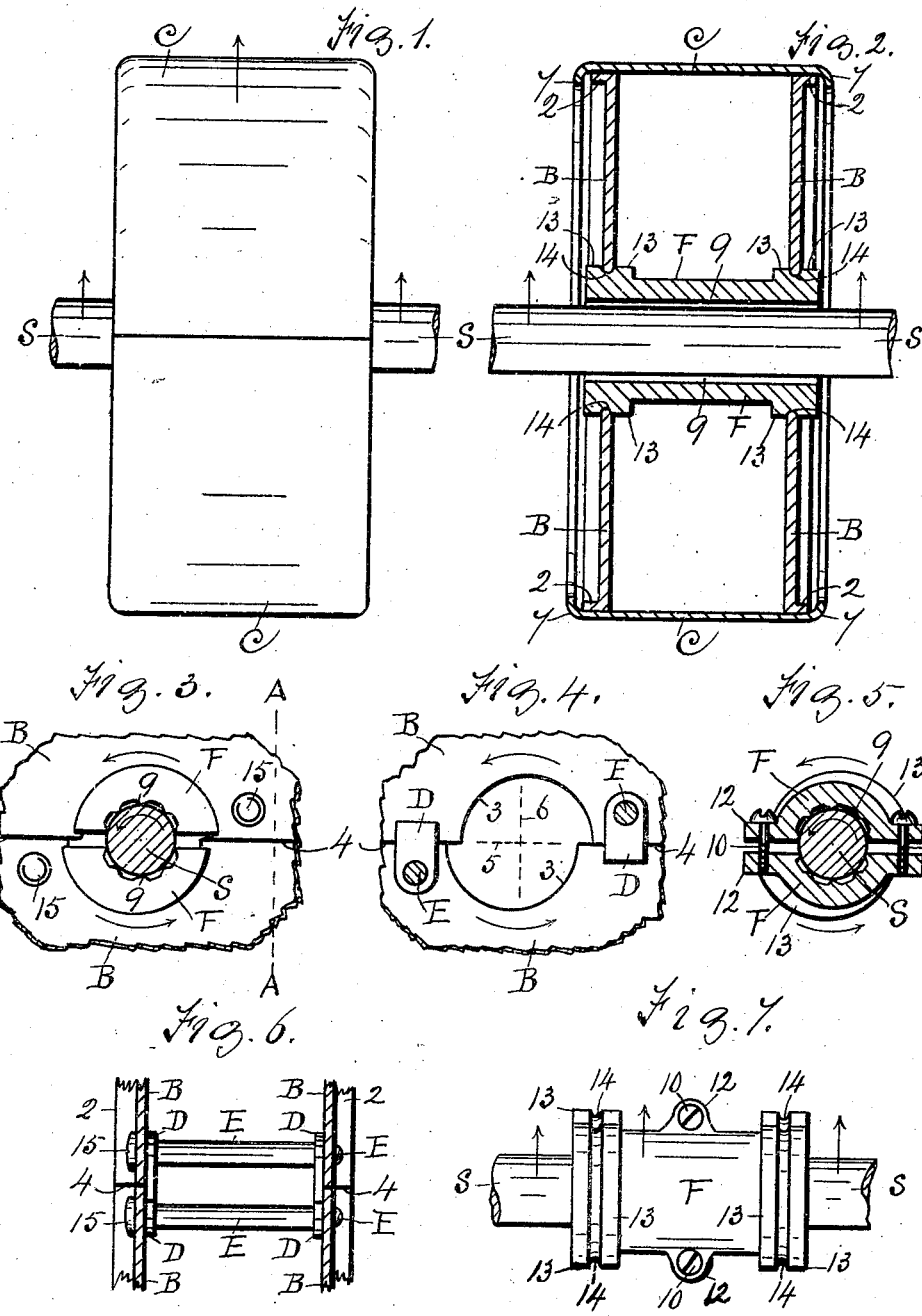

UNITED STATES PATENT OFFICE.

HUGH D. WALKER, OF GRIMSBY, ONTARIO, CANADA, ASSIGNOR OF ONE-HALF TO DAVID WOOD SOWERS, OF BUFFALO, NEW YORK.

SPLIT PULLEY.

937,742. Specification of Letters Patent. Patented Oct. 19, 1909.

Application filed May 15, 1907. Serial No. 373,776.

*To all whom it may concern:*

Be it known that I, HUGH D. WALKER, a subject of the King of Great Britain, and resident of Grimsby, in the county of Lincoln and Province of Ontario, Canada, have invented new and useful Improvements in Split Pulleys, of which the following is a specification.

This invention relates to pulleys for the transmission of power, my improvements being of special utility when embodied in "split" pulleys and preferably those formed with wooden rim and wooden webs, with wooden rim and metal webs, or with metal rim and metal webs, although it will be understood that I contemplate the use of my invention in any field to which it is adapted by the nature of my improvements.

In transmitting power, a line of shafting frequently is provided with many pulleys closely adjacent, and when one or more of the pulleys have to be removed and reset, as often happens, much time is wasted while the shaft is stopped, the other pulleys rendered idle and the connected machinery shut down until the replacement of the one pulley is completed. This loss is greater when it is necessary to remove and reset the hub of the pulley in addition to replacing the pulley, for the operation of setting the hub exactly in its proper place is one of great nicety. Accordingly, an important object of my invention is to provide a pulley which can be quickly and easily removed from its hub, leaving the hub in place upon the shaft so that the same pulley may be replaced with equal facility, or a pulley of different diameter or width may be applied to the same hub while still in place.

Another object of my invention is to provide means by which the torque resulting from the application of power either to the rim or hub of the pulley will cause these parts to engage each other quickly and firmly for co-rotation, without the necessity for elaborate adjustment of other means of attachment. I provide also means to obviate the necessity for using any set screws outside of the web or webs of the pulley, so that the pulley in the preferred form of my device presents at each side a substantially solid web surface free from projections likely to engage and injure persons coming near to the rotating pulley.

The various features of my invention will be illustrated and described fully in the accompanying drawings and specification, and pointed out in the claims.

In the drawings:—Figure 1 shows in front elevation a split pulley in the construction of which my improvements have been embodied; Fig. 2 is a view in vertical sectional elevation taken on a plane passing through, and parallel with, the axis of rotation of the pulley shown in Fig. 1; Fig. 3 is a fragmentary detailed view in side elevation, looking from left to right on Fig. 1, the shaft being shown in section; Fig. 4 is a fragmentary view in side elevation, taken within the pulley and looking from left to right, the shaft and hub being omitted; Fig. 5 is a central transverse vertical sectional view of the hub and shaft looking from left to right, Fig. 1; Fig. 6 is a transverse vertical sectional view taken on the line A—A, Fig. 3, and looking from right to left; and Fig. 7 is a plan view of the hub and shaft.

In the embodiment of my invention selected for illustration and description as a convenient form to enable ready and complete understanding of my improvements; the reference letter B designates the sides, heads or webs of the pulley, which may be of any suitable number and material and situated at any suitable distance apart, these serving to support the rim C, the pulley being preferably divided into a plurality of segments each comprising a part of the rim and a corresponding section of web. By the expression "web" I designate that portion of the pulley or analogous device which intervenes between the rim and hub, whether this web be substantially continuous, as I prefer, or of other structure usual or suitable for the construction of such devices. In the instance illustrated, the rim and webs are shown as formed of sheet metal, and the segments are semicircular, the pulley being divided into halves, each web B having a flange 2 to which the rim is joined in suitable fashion as by fusing, welding, brazing or riveting, and the rim is preferably swaged or bent over the flange as indicated by the numeral 7 so that it presents a safety rounded edge over which the belt may easily be introduced to the rim and which will not injure the person of the operator in case of accidental contact during rotation.

In accordance with my invention, I provide means by which the component segments may be secured in assembled position in such a way as to permit their assemblage and separation without disturbing the hub, and as one convenient form of such fastening means, I have shown straps or lips D (see Figs. 3, 4, and 6) welded or otherwise secured to the webs adjacent the central division line 4 and projecting beyond the said line over the inner surface of the adjoining web of the other segment, the straps serving as guides to maintain the web parts in alinement and having apertures through which connecting pins or bolts E may be inserted, these bolts passing also through holes in the webs and having at one end heads 15 which project outside one of the webs (see Fig. 3), and serve as means to enable ready withdrawal of the pins from the pulley, leaving the segments free to be separated. I prefer to have these pins positioned snugly in the holes of the straps and webs but not fastened permanently therein, inasmuch as the centrifugal force which tends to separate the segments will cause the straps and webs respectively to engage the pins and hold them in place. I have also shown a shaft S and this may be of any suitable form, being cylindrical and plain in the instance illustrated, and in accordance with my invention I provide a hub F with means to enable it to be secured in adjusted position upon the shaft, independently of the presence or absence of the pulley, the hub having also means to engage the pulley in such a way that the torque resulting from the application of power to the rim or hub will cause engagement of the web sections with the hub parts, crowding the hub parts together upon the shaft and insuring co-rotation of the parts with the shaft.

I prefer to form the hub in halves and as convenient means to enable the halves to be secured in assembled relation and in adjusted position upon the shaft, I have shown screws 10 passing through lugs 12 projecting from the halves of the hub. This means will preferably only secure the hub lightly upon the shaft, which may be of any convenient diameter, varying considerably in size, and I prefer to form corrugations upon the interior of the hub as indicated by the reference numeral 9 (see Fig. 5) to aid the gripping action of the hub. I rely, however, as the source of the principal gripping actuation upon the means interposed at the region of contact between the hub and the walls of the semicircular apertures 5 in the webs through which the hub passes, and while this means may take any suitable form, I have shown as one convenient form an eccentrically formed collar composed of two parts bearing the reference numerals 13, formed one upon each half of the hub, extending in opposite directions, and having preferably grooves 14 to receive correspondingly formed eccentric walls 3 of semi-circular shaft apertures in the webs of the pulley, the grooves serving as one convenient form of means to prevent accidental lateral displacement of the web along the hub.

Upon the application of power to the shaft in the direction of the arrows in the respective figures, the eccentric collars 13 will be caused by the resulting torque to wedge themselves against the walls 3, and the hub parts will be crowded together into engagement with the shaft S, while at the same time the eccentric hub collars 13 tend to separate the pulley halves B aiding the centrifugal action in causing the straps and webs to grip the connecting pins E, and retain them in place. A similar result will follow if power is applied to the rim of the pulley in a direction opposite that of the arrows.

Upon the stoppage of rotation the pins will be released, may be withdrawn freely, and the parts will be left free for separation, so that the pulley can be removed leaving the hub in place if desired. By slightly turning the webs in the direction of the arrow, Fig. 3, this loosening of the parts may be accomplished more readily. The same pulley or another of different size can be placed upon the hub by manipulation of the parts in reverse order, and with ease and speed, no tools being needed.

It will be obvious upon inspection of Fig. 2 that the pulley presents no set screws or projections beyond its head which would catch or injure the clothing of a person coming into contact with the pulley, and as the heads are substantially solid there will be no possibility of the injuries commonly resulting from thrusting the hand or other objects between the spokes of the pulleys.

Two webs or heads are shown in Fig. 2, but if desired, additional webs or flanges may be provided, as in the instance of pulleys with wooden rims, where a circular flange may be provided in the center, to assist in holding up the rim.

In placing the pulley on a shaft, the split hub F is first secured in place by means of the screws or bolts 10 through the lugs 12 of the split hub F. The two halves of the pulley are placed on the hub, the sides B having the eccentric holes 3 are placed in the eccentric grooves 14 of said hub, and the pins E are then inserted through the sides B and through the guides or lips D which form a part of the semi-circular sides B and fit in close contact with the two adjoining semi-circular sides B, and assist very materially in retaining said sides in flush position with each other.

When the pulley is in rotary motion, together with the shaft S, and said shaft being the driver, the shaft together with the hub and pulley rotates in the direction indicated by arrows in the several figures of the drawing. In the rotary direction indicated, the tendency of the power of the shaft is to separate the one half of the pulley from the other half of the pulley and exert a strain upon the pins E, the sides B adjoining the retaining lips D pulling the straps in opposite directions, thereby tightening the pins E more securely in position on account of this opposite pull.

As viewed from the same line of vision, and when the pulley drives the shaft, the pulley and hub together with the shaft would rotate in the opposite direction to the one indicated by arrows, and the same above mentioned strain would be exerted upon the pins E, which in either case retains the halves of the pulley in juxtaposition on the dividing line 4. The pins E would answer the same purpose were all the lips D on one half of the pulley and extending and overlapping the adjoining sides of the pulley with the pins through said sides and overlaps.

Having illustrated and described my invention thus fully, and convenient means for carrying the same into effect, it will be understood that I do not limit myself to the specific material or construction shown and described, nor in general otherwise than as set forth in the claims read in connection with this specification.

What I claim as my invention and desire to secure by Letters Patent, is:—

1. In a split pulley, semi-circular halves having semi-circular holes eccentric with the pulley and in opposite directions, a concentric shaft, an eccentric hub in halves adapted to fasten on the shaft and to conform to and fit in the said eccentric holes of the pulley side, said halves having retaining lips on the sides of the pulley and retaining pins through said sides and lips, said pins being arranged to be retained by the centrifugal engagement of said sides and lips during rotation of said pulley.

2. In a split pulley, semicircular sides having semi-circular holes eccentric with the pulley and in opposite directions, said halves being provided with flanges extending from their periphery, a concentric shaft, a hub in halves having a corrugated hole to fit on the shaft, means for securing the hub to the shaft, said hub having eccentric grooves to conform to and to receive said sides, and said sides having lips extending therefrom and overlapping the adjoining sides and means to retain said sides and lips in position.

3. A pulley in halves, one said half having an eccentric hole, and the other said half having a similar hole eccentric in the opposite direction, and adjoining as one hole, a concentric shaft, an eccentric hub in halves secured to the shaft and conforming to and fitting in said eccentric hole of the pulley, said halves having lips extending therefrom in opposite directions and overlapping the adjoining halves and retaining means extending through the halves of the pulley and through said lips, to be engaged thereby upon centrifugal action of said halves and lips during rotation of said pulley.

4. In a pulley in halves, a removable hub in halves having a concentric corrugated hole, and eccentric collars, or flanges, having eccentric grooves on one said half, similar collars, or flanges having similar grooves eccentric in the opposite direction on the other half, sides of a pulley in halves, having eccentric holes in opposite directions and adapted to conform to and fit into said grooves, a central shaft, means to fasten the corrugated part of the hub on the shaft, and means to hold the sides of the pulley in flush position with each other, and means to retain said sides one with the other, when strain or tension is brought to bear upon the shaft, or bear upon the pulley, to cause rotation of the same.

5. A pulley of the class described; comprising a hub; a rim and its supporting web mounted loosely upon said hub; means upon said hub and web, acting upon the rotation of one of said parts to bind said parts together; and means to secure said hub upon a shaft independently of said web; substantially as described.

6. A pulley of the class described; comprising a hub; a rim; a rim-supporting web composed of a plurality of segments mounted loosely upon said hub; and means to fasten said segments in assembled relation, said means being held in adjusted position by the action thereon of said segments during rotation of said pulley, and being withdrawable upon diminution of said retentive action when said pulley is at rest.

7. A pulley of the class described; comprising a segmental hub having eccentric projections; a rim; a rim-supporting web composed of a plurality of segments having apertures forming upon assemblage an eccentric axial aperture to receive loosely said eccentric hub projections; and connecting devices engaging said web segments to retain the same loosely in assembled relation upon said hub; rotation of said rim or hub causing wedging of said eccentrics, corotation of said hub and segments and retentive binding action of said segments upon said devices, the latter being withdrawable to permit separation of said segments from each other and from the hub when said pulley is at rest, upon reverse relative rotation of said rim and hub.

8. The combination with a pulley having segmental webs with overlapping portions, of a pin passing through said portions to connect the same loosely, said pin being withdrawable freely when said pulley is at rest, substantially as described.

9. In a pulley of the class described; the combination with a hub arranged to receive a shaft and means to secure it in adjusted position thereon, said hub being provided with an eccentric portion; of a web member provided with an aperture having an eccentric wall to engage and coöperate with said hub eccentric; substantially as described.

10. In a pulley of the class described; the combination with a hub arranged to receive a shaft and means to secure it in adjusted position thereon, said hub being provided with independent eccentric portions, one near each end; of a plurality of web members provided respectively with apertures having eccentric walls to engage and coöperate respectively one with each of said hub eccentrics; substantially as described.

11. In a pulley of the class described, the combination with a split hub having a plurality of segments arranged to embrace a shaft, and means to secure said hub on said shaft, said hub segments having respectively eccentric projections oppositely arranged; of a plurality of web members provided respectively with apertures having eccentric walls to engage and coöperate respectively one with each of said hub eccentrics; and means to secure said web segments removably in assembled relation upon said hub.

12. A pulley of the class described; comprising a hub; a segmental rim mounted loosely upon said hub; segmental web members forming in assembled relation solid pulley heads intermediate said rim and hub, adjacent each end thereof; and means to connect said web segments, said means being withdrawable freely when said pulley is at rest, to permit separation of said parts, substantially as described.

13. A split pulley; comprising a plurality of segmental webs; a hub provided near each end with peripheral grooves to receive, and prevent lateral displacement of, said web segments; said webs and grooved hub portions being eccentrically formed respectively to cause wedging of said hub within said web by the torque therebetween during rotation.

14. A split hub for pulleys of the class described; said hub comprising a plurality of segments and means to secure the same upon a shaft; each of said segments having a peripheral eccentric portion; substantially as described.

15. A split hub for pulleys of the class described; said hub comprising a plurality of segments and means to secure the same upon a shaft; each of said segments having near the ends respectively independent, peripheral eccentric portions; substantially as described.

16. A segment for split hubs of the class described; comprising an elongated member having an axial shaft receiving groove, and having near each end a peripheral eccentric enlargement with an eccentric groove, substantially as described.

17. A segment for split hubs of the class described; comprising an elongated member having a corrugated shaft receiving groove, and having near each end a peripheral eccentric enlargement with an eccentric groove, substantially as described.

18. A segment for split hubs of the class described; comprising a member having an axial shaft-receiving portion and having a plurality of peripheral eccentric seats; substantially as described.

19. A hub for pulleys of the class described; said hub being arranged to receive a shaft and provided with means to secure said hub thereon, said hub having also a peripheral eccentric portion; substantially as described.

20. In a device of the class described, the combination with a member having an axial shaft-receiving portion and a peripheral eccentric portion; of a member arranged to be engaged peripherally with said shaft-receiving member and having a limited rotative movement relative thereto, said latter member having an eccentric portion to coöperate with said peripheral eccentric portion to cause co-rotation of said members; and means to secure said shaft-receiving member to said shaft independently of said latter member; substantially as described.

21. In a device of the class described, the combination with a member having an axial shaft-receiving portion and an eccentric portion; of a member arranged to be engaged with said shaft-receiving member and having a limited rotative movement relative thereto, said latter member having an eccentric portion to coöperate with said eccentric portion on said shaft-receiving member to cause co-rotation of said members; and means to secure said shaft-receiving member to said shaft independently of said latter member; substantially as described.

22. In a device of the class described; the combination with a hub provided with an eccentric portion; of a web member provided with an aperture having an eccentric wall to engage and coöperate with said hub eccentric; and means to secure said hub upon a shaft independently of said web; substantially as described.

23. In a device of the class described; the combination with a hub provided with a plurality of eccentric portions arranged in planes at an angle to the axis of rotation of said device; of a web arranged to engage and coöperate with said hub eccentrics respectively; substantially as described.

24. In a device of the class described; the combination with a hub provided with a plurality of eccentric portions arranged in different planes; of a web arranged to engage and coöperate with said hub eccentrics respectively; substantially as described.

25. A device of the class described; comprising a rim; and a web member and a hub member provided respectively with eccentric portions coöperating to bind said hub and web together for co-rotation, one of said members having a recessed portion and another of said members having a portion to enter said recessed portion to maintain said hub and web member in adjusted lateral relation; substantially as described.

26. A device of the class described; comprising a rim; and a web member and a hub member provided respectively with eccentric portions coöperating to bind said hub and web together for co-rotation, one of said members having a groove and another of said members having a ridge to enter said groove to maintain said hub and web members in adjusted lateral relation; substantially as described.

27. A pulley of the class described; comprising a hub; a rim; a web; and means to fasten said web in adjusted position on said hub; said means comprising a member transfixing said web and presenting a head to permit withdrawal of said member, said head lying closely adjacent to said web and being free from projections to engage extraneous objects; substantially as described.

28. A pulley of the class described; comprising a hub; a web member mounted upon said hub, and having a limited rotative play relatively thereto; a rim, and means to connect said web member and rim for co-rotation; means to secure said hub upon a shaft independently of said web member; and means intermediate said hub and web member acting upon rotation of one relatively to the other to bind said web member and hub together; substantially as described.

29. A pulley of the class described; comprising a hub; means to secure said hub on a shaft; a segmental rim; and a segmental supporting web adjacent each edge of said rim, said web segments being connected to said rim parts, and forming continuous pulley heads when assembled; said rim and web segments being removable from said hub substantially in the operative plane of the pulley, leaving said hub in place; substantially as described.

30. A split pulley; comprising a plurality of segmental webs; a hub provided near each end with peripheral grooves to receive removably, and prevent lateral displacement of, said web segments when the latter are assembled upon said hub; and means to fasten said segments in assembled relation upon said hub, substantially as described.

31. A pulley of the class described; comprising a hub; means to secure said hub on a shaft; a rim; and a web composed of segments forming when assembled an uninterrupted pulley head; said pulley being free from projections to engage extraneous objects, throughout its superficial area; and said web-segments being removable from said hub substantially in the operative plane of said pulley and while said hub is in place; substantially as described.

32. A pulley of the class described; comprising a hub; and means to secure said hub upon a shaft; a segmental rim; and a web composed of segments forming, when assembled, a solid pulley head free from projections to engage extraneous objects; said hub-securing means being confined within said web; and said rim segments being connected to, and removable with, said web segments respectively; substantially as described.

33. A pulley of the class described; comprising a hub, a segmental rim, and a supporting web adjacent each edge of said rim and connected with the segments thereof, said webs forming pulley heads removable with said rim parts; means, confined within said heads, to secure said hub upon a shaft; and means, also within said heads, and operable from outside the latter, to secure said web removably upon said hub; substantially as described.

HUGH D. WALKER.

Witnesses:
 JOHN H. HENDRY,
 ARTHUR E. WOLLNY.